United States Patent [19]
Filiberti et al.

[11] Patent Number: 5,645,390
[45] Date of Patent: Jul. 8, 1997

[54] SYSTEM AND METHOD FOR CONVEYING CARGO CONTAINERS THROUGH ENVIRONMENTALLY CONTROLLED ENCLOSURES

[75] Inventors: Richard J. Filiberti, Rochester; Fredric Salsburg, Victor; William E. Roberts, Fairport, all of N.Y.

[73] Assignee: Eastman Kodak Company, Rochester, N.Y.

[21] Appl. No.: 267,262

[22] Filed: Jun. 27, 1994

[51] Int. Cl.$^6$ ............................................. B65G 47/00
[52] U.S. Cl. ................. 414/390; 414/528; 414/401; 414/584; 414/398; 414/396; 414/273; 414/217; 364/478.01; 15/3
[58] Field of Search ........................... 414/273, 217, 414/398, 390, 395, 393, 392, 396, 401, 584, 528, 527, 529; 364/478; 15/3

[56] References Cited

U.S. PATENT DOCUMENTS

| | | |
|---|---|---|
| 2,715,969 | 8/1955 | Olsen . |
| 3,397,802 | 8/1968 | Hinchee ............................... 414/396 |
| 3,704,798 | 12/1972 | Carpenture, Jr. et al. . |
| 3,709,450 | 1/1973 | Watts et al. ........................... 244/118 |
| 3,710,961 | 1/1973 | Bomstein ............................... 414/396 |
| 3,749,268 | 7/1973 | Macomber et al. . |
| 3,756,544 | 9/1973 | Bader .................................... 244/137 R |
| 3,777,916 | 12/1973 | Lutz . |
| 3,905,494 | 9/1975 | Yatagai et al. . |
| 3,999,671 | 12/1976 | Lutz . |
| 4,403,803 | 9/1983 | Szendrodi et al. ..................... 414/398 X |
| 4,756,659 | 7/1988 | Bader ..................................... 414/502 |
| 4,780,041 | 10/1988 | Ashby, Jr. ............................. 414/398 |
| 4,844,684 | 7/1989 | Bradley ................................. 414/528 |
| 4,887,937 | 12/1989 | Thunnissen ........................... 414/527 |
| 4,892,456 | 1/1990 | Hodgetts ................................ 414/527 |
| 4,941,794 | 7/1990 | Hara et al. ............................. 414/341 |
| 4,948,325 | 8/1990 | Hodgetts ................................ 414/527 |
| 5,054,987 | 10/1991 | Thornton ............................... 414/390 |

FOREIGN PATENT DOCUMENTS

| | | | |
|---|---|---|---|
| 393245 | 10/1990 | European Pat. Off. ............ 414/401 |
| 2424392 | 12/1975 | Germany ........................... 414/398 |
| 3327182 | 2/1984 | Germany ........................... 414/401 |
| 254669 | 10/1993 | Japan .................................. 414/390 |

*Primary Examiner*—Frank E. Werner
*Attorney, Agent, or Firm*—Clyde E. Bailey, Sr.

[57] ABSTRACT

System (10) for automatically conveying photosensitive cargo containers (15) through a storage compartment (14) of a vehicle, preferably a trailer (12) and selective environmentally controlled enclosures (32,40,42) comprises a conveyor device (18) positioned in the storage compartment (14) that cooperates with interconnected conveying device (34) in the enclosures (32,40,42). Devices are provided for aligning and positioning the rear exit end (16) of vehicle (12) snugly against the entrance port (30) of a proximally positioned enclosure (32). A system control device (100) connecting the conveying means (18) and conveying device (34) enables the cargo containers (15) to be automatically conveyed from the vehicle (12), through the entrance port (30) and into the proximal enclosure (32).

7 Claims, 13 Drawing Sheets

1

SYSTEM AND METHOD FOR CONVEYING CARGO CONTAINERS THROUGH ENVIRONMENTALLY CONTROLLED ENCLOSURES

FIELD OF THE INVENTION

The invention relates to conveying cargo containers. More particularly, the invention concerns an automatic system and method for conveying cargo containers, particularly those containing photosensitive film product, through a load-conveying vehicle to selective environmentally controlled enclosures substantially without exposing the cargo containers to operator intervention and particulate contamination.

BACKGROUND OF THE INVENTION

Conventional cargo loading and unloading operations at a typical loading dock involves the use of a lifting mechanism, such as a fork lift, that typically removes cargo from a trailer and then transports the cargo to some sort of staging platform. Cargo including photosensitive material is normally protected from contamination by cargo containers. Despite the best manual handling practices, the incoming cargo may be exposed to ambient environmental conditions, particulate contaminants being most disadvantageous, when removed from the cargo container prior to processing. Therefore, protecting the cargo container from airborne particulate contamination which could potentially migrate to the cargo is an important factor in overall cargo management. More particularly, handling photosensitive cargo, such as film rolls, requires that the photosensitive cargo not be exposed to environmental particulate contaminants. However, because material handlers presently have to enter the dock area, remove the photosensitive cargo from the trailer and then transfer it to a conveyor accessing the clean room or environmentally controlled area, there is a substantial risk that the photosensitive cargo will become contaminated or damaged by manual handling, and thus not be suitable for processing or customer use.

Numerous prior art attempts to address some aspects of the aforementioned problem involve the use of automatic conveyor floors built into the trailer such as those described in U.S. Pat. Nos. 4,892,456, 4,948,325, 4,887,937, 4,844,684, 4,756,659, 3,905,494, 3,749,268, and 3,999,671. However, a major shortcoming of the devices described in each of these patents, such as the automated load and unload highway trailer device disclosed in Bader '659, is that there is no means for precisely positioning the trailer fixed conveyor assembly against an entrance portion of an environmentally controlled dock enclosure so as to resist introducing particulate contaminants into the controlled dock enclosure.

Another shortcoming clearly evident with the present systems is that there is no means for protecting the photosensitive cargo from contaminants during reloading onto a trailer in preparation for shipment.

Furthermore, existing systems do not provide means for automatically controlling the entire loading and unloading operation without significant operator intervention.

Accordingly, there persists a need for a system and method for transporting cargo containers, such as containers of photosensitive film material, from a cargo carrying vehicle through and between a plurality of environmentally controlled enclosures and return the cargo containers to the vehicle without exposing the cargo to particulate contamination and with minimum operator intervention.

SUMMARY OF THE INVENTION

It is, therefore, the object of the invention to overcome the shortcomings of the prior art. Accordingly, for solving one or more of the aforementioned problems, there is provided, in one aspect of the invention, a system for conveying cargo containers through a cargo-carrying vehicle and selective environmentally controlled enclosures, substantially without operator intervention and exposure of the cargo containers to contamination, the system comprising an entrance port, and at least one of the enclosures being positioned proximal to the vehicle, the vehicle having a storage compartment for containing the cargo containers and an exit end for passing the cargo containers therethrough, the system comprising:

a first means for precisely aligning and positioning the exit end of the vehicle with the entrance port;

a second means operatively associated with the vehicle for conveying the cargo containers from the storage compartment of the vehicle, through said entrance port and into said proximal enclosure;

a third means in the proximal enclosure for conveying the cargo container in a predetermined direction so as to selectively load or unload the cargo containers said proximal enclosure or in the storage compartment of the vehicle; and, a system control means cooperatively associated with the vehicle and the environmentally controlled enclosures for automatically actuating the second and third means once the aligning and positioning means has been confirmed.

Moreover, in another aspect of the invention, a method of conveying cargo containers through a cargo-carrying vehicle and selective environmentally controlled enclosures substantially without operator intervention and exposure of the cargo containers to particulate contamination, the vehicle having a storage compartment for the cargo containers and an exit end for passing the cargo containers therethrough, the environmentally controlled enclosures comprising an entrance port, and at least one of the enclosures being positioned proximal to the exit end of the vehicle, the method comprising the steps of:

providing a load bearing powered conveying means structurally connected inside the storage compartment of the vehicle;

providing means cooeperatively associated with the vehicle and the proximal enclosure for precisely aligning and positioning the exit end of the vehicle with the entrance port of the proximal enclosure;

aligning and positioning the exit end of the vehicle against the entrance portion of one of the environmentally controlled enclosures;

conveying the cargo from the trailer conveyor means to one of the environmentally controlled enclosures; and, providing means cooperatively associated with said vehicle and environmentally controlled enclosures for selectively controlling the flow and distribution of the cargo containers to any one of the environmentally controlled enclosures or to the cargo compartment of the vehicle; and, actuating the controlling means.

Accordingly, an important advantage of the present invention is that it provides a system and method for transporting photosensitive cargo through a vehicle and environmentally controlled enclosures and returning the processed photosensitive cargo to the vehicle without exposing the cargo to particulate contamination, and with minimum operator intervention.

BRIEF DESCRIPTION OF THE DRAWINGS

The foregoing as well as other objects, features and advantages of this invention will become more apparent from the appended figures, wherein like numerals denote like elements, and wherein.

DETAILED DESCRIPTION OF THE INVENTION

Figure 1:
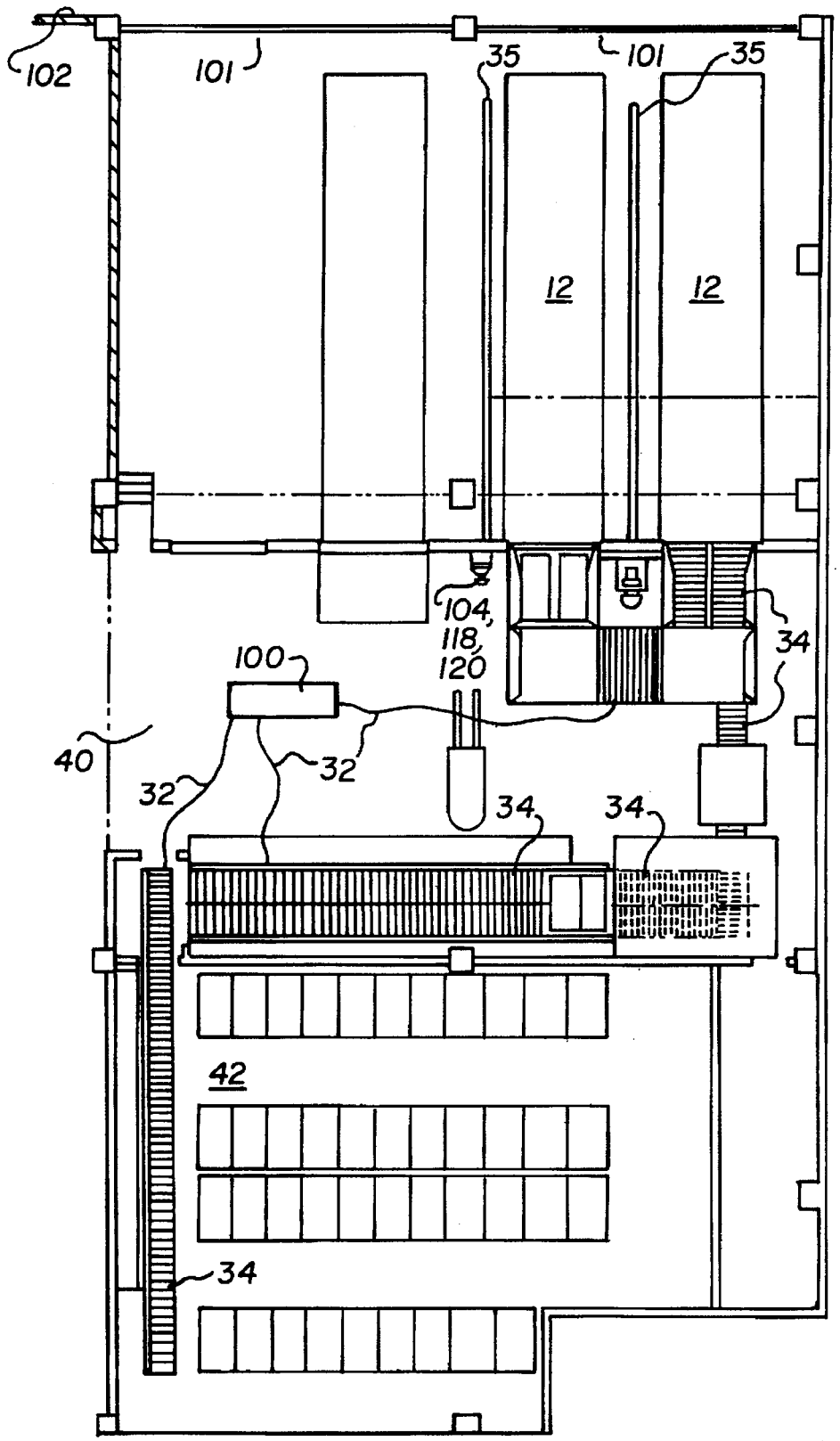
FIG. 1 is a plan layout view of a cargo conveying system according to the principals of the invention.

Turning now to the drawings, and more particularly to FIG. 1, there is shown the system 10 which constitutes the preferred embodiment of the invention. Broadly, system 10 comprises a vehicle, preferably a trailer 12, having a cargo carrying compartment 14, a floor portion provided with means 18 for storing/conveying cargo containers 15 (preferably of photosensitive material), and a rear exit end 16 through which cargo containers 15 are loaded and unloaded, described in details below. Moreover, means are provided for precisely positioning and interlocking the rear exit end 16 of trailer 12 against at least a partially environmentally controlled dock enclosure 32, described further below. According to FIG. 1, a substantially unified automatic conveyor means 34 traversing through a series of progressively higher level environmentally controlled enclosures 32,40,42 (described below) is provided to ensure that cargo containers 15 during cleaning, storage, processing and finally repacking for shipment do so with minimum operator intervention. Further, the cargo containers 15 of the invention are provided with a bar-code 23 for easy identification and selective distribution in the materials handling network as defined by the various communicating conveying means 34 interconnecting environmentally controlled enclosures 32,40,42 of the invention. The preferred conveying means 34 are load bearing conveyor rollers, although other means within the definition of the invention may be used, such as a belt.

Figure 2:
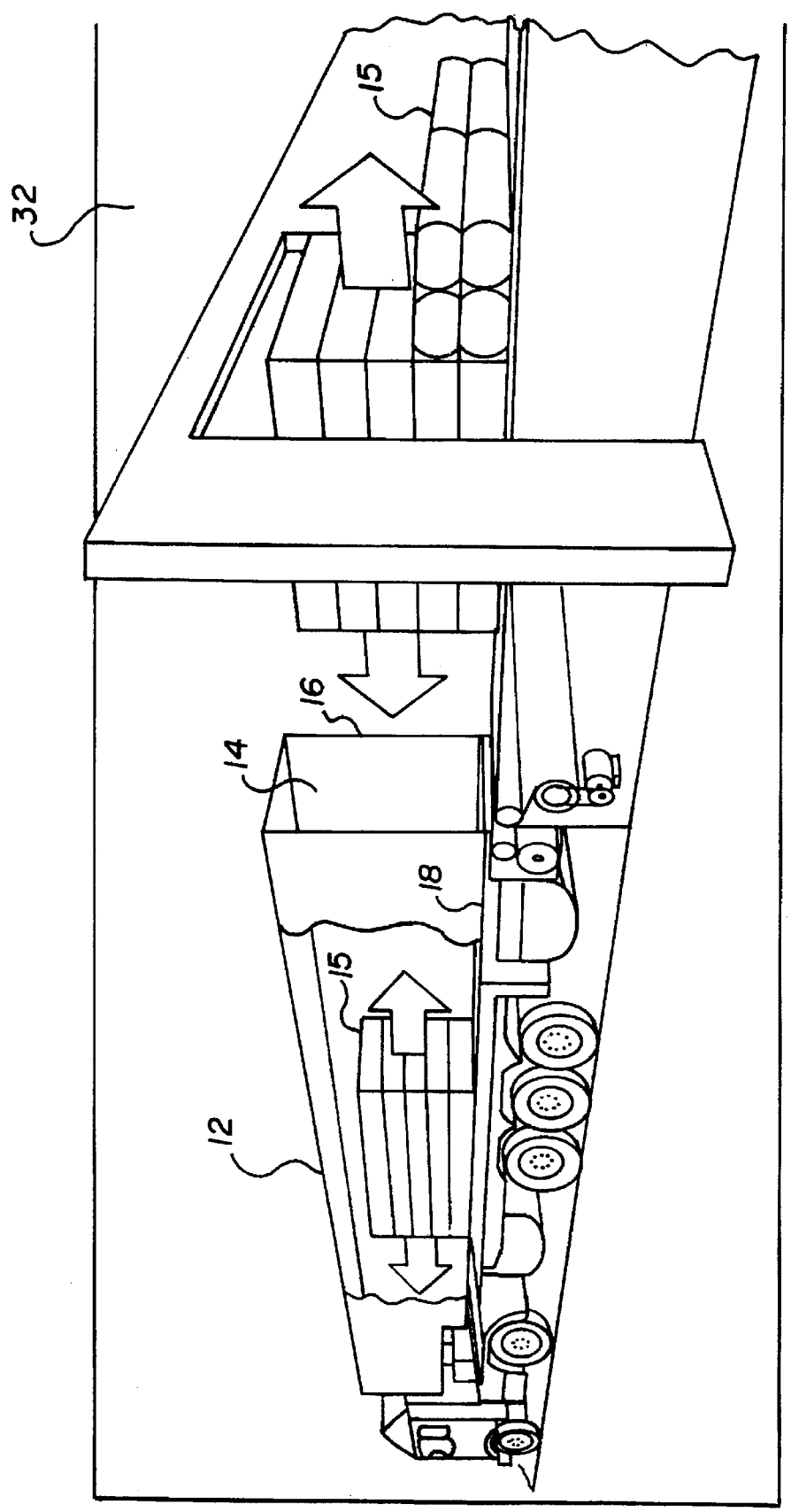
FIG. 2 is an isometric view of a load-conveying vehicle cooperating with a load bearing conveying system in an environmentally controlled enclosure.
Figure 3:
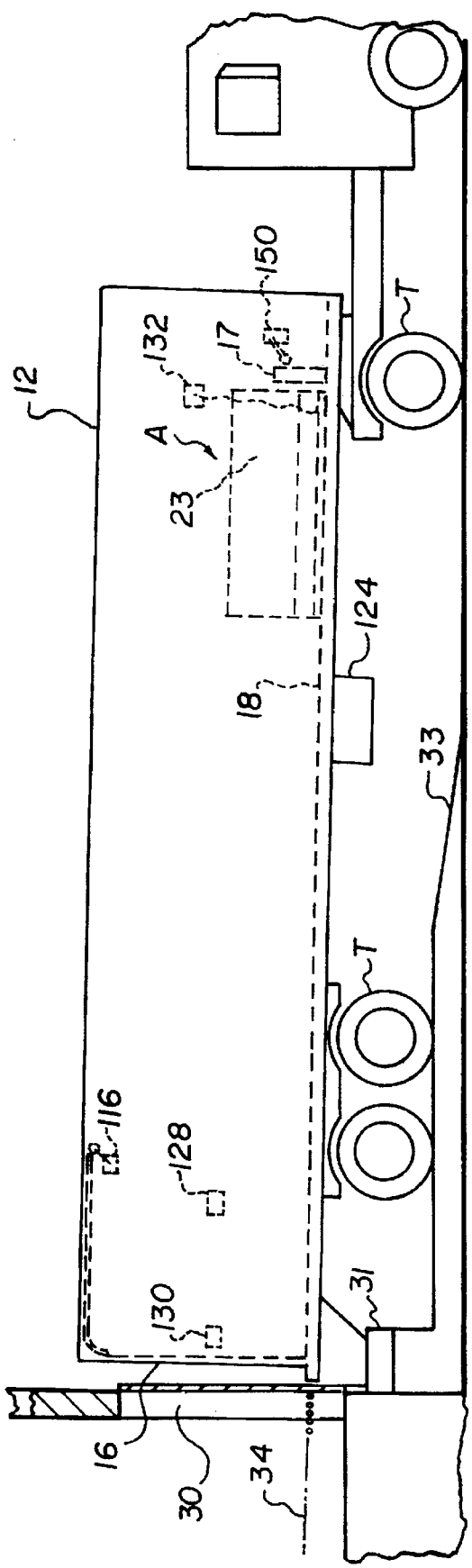
FIG. 3 is a side elevational view of a trailer showing the load conveying system in accordance with the principals of the invention.

As best illustrated in FIGS. 2 & 3, trailer 12 comprises at least one load bearing conveying means, preferably a conveyor belt 18, cooperatively connected to the floor portion of the trailer cargo carrying compartment 14. Conveyor belt 18 is adapted for rearward and forward movement (at an instance) for loading or unloading cargo containers 15 onto or from the trailer 12. More particularly, conveying means 18 can advance the cargo containers 15 from the trailer 12 into the entrance portion 30 of the first environmentally controlled enclosure 32 and beyond. Since cargo containers 15 of photosensitive materials generally require gentle handling, means are incorporated for conveying the cargo containers 15 at controllably slow speeds of about 20 feet per minute. Those skilled in the art will appreciate that other means of conveying cargo 15 from the trailer 12 may be used, such as rollers and the like. The preferred vehicle conveyor belt 18 is manufactured by Rolfor Industries, Inc., P.O. Box 750, Warrendale, Pa. 15095.

Figure 4:
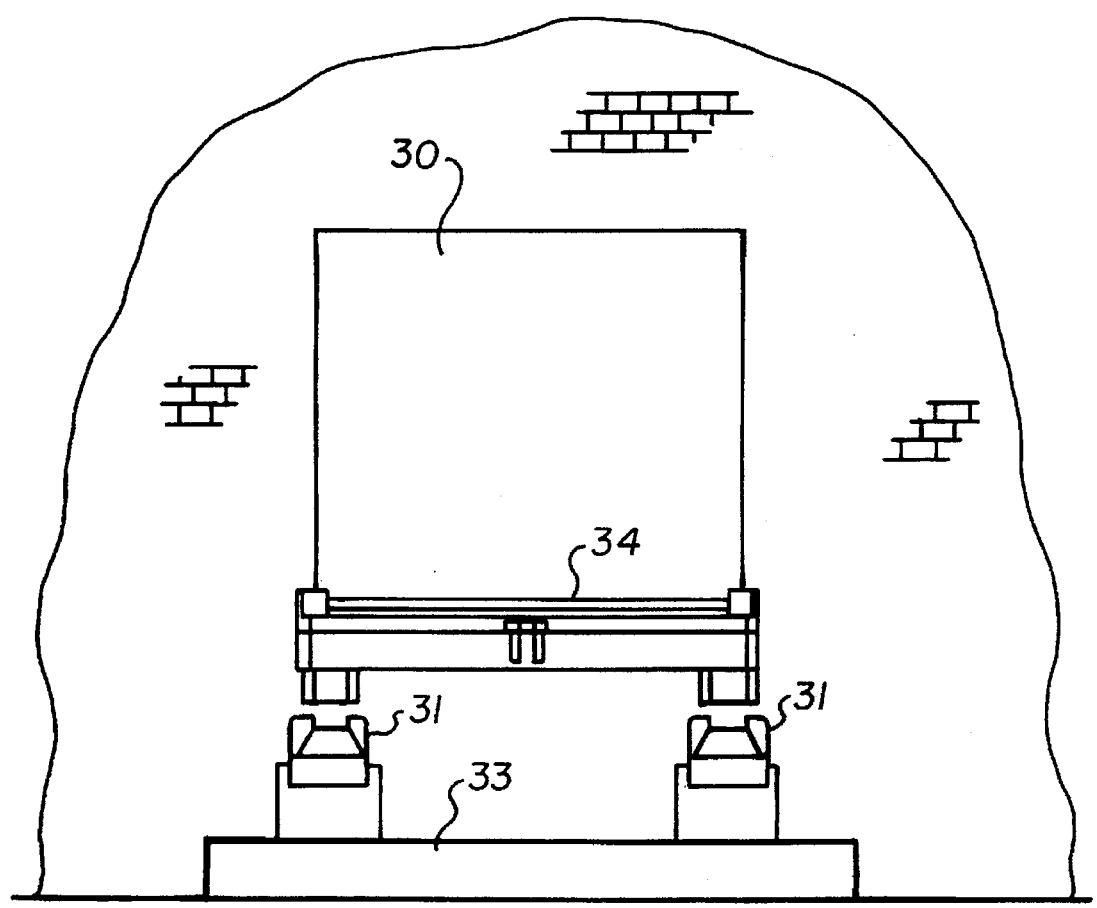
FIG. 4 is a front plan view of the dock door opening showing the vehicle guidance system.
Figure 8:
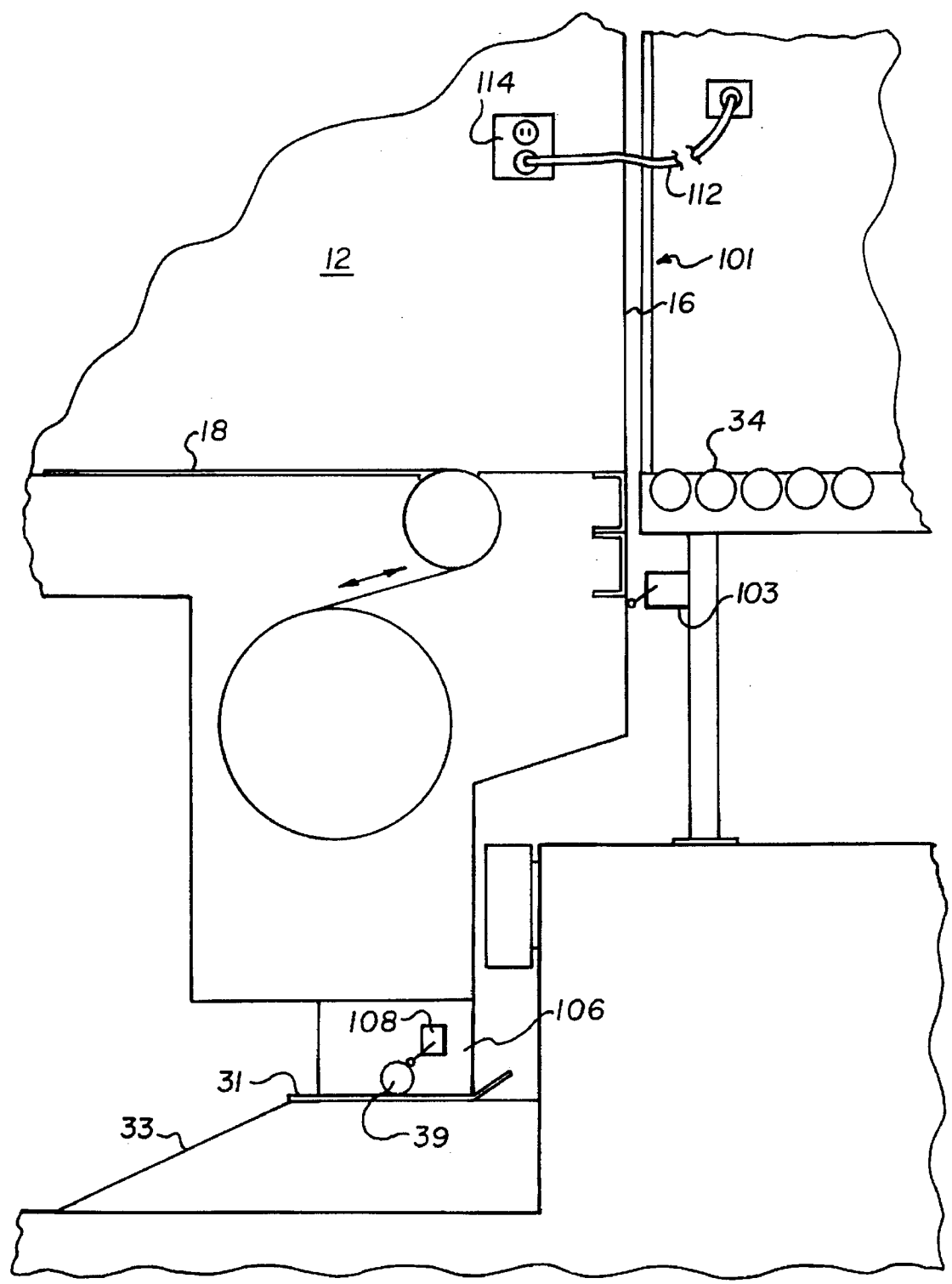
FIG. 8 is a fragmentary schematic view of the vehicle conveying means interfacing with the conveying means of the first environmentally controlled enclosure.
Figure 9A:
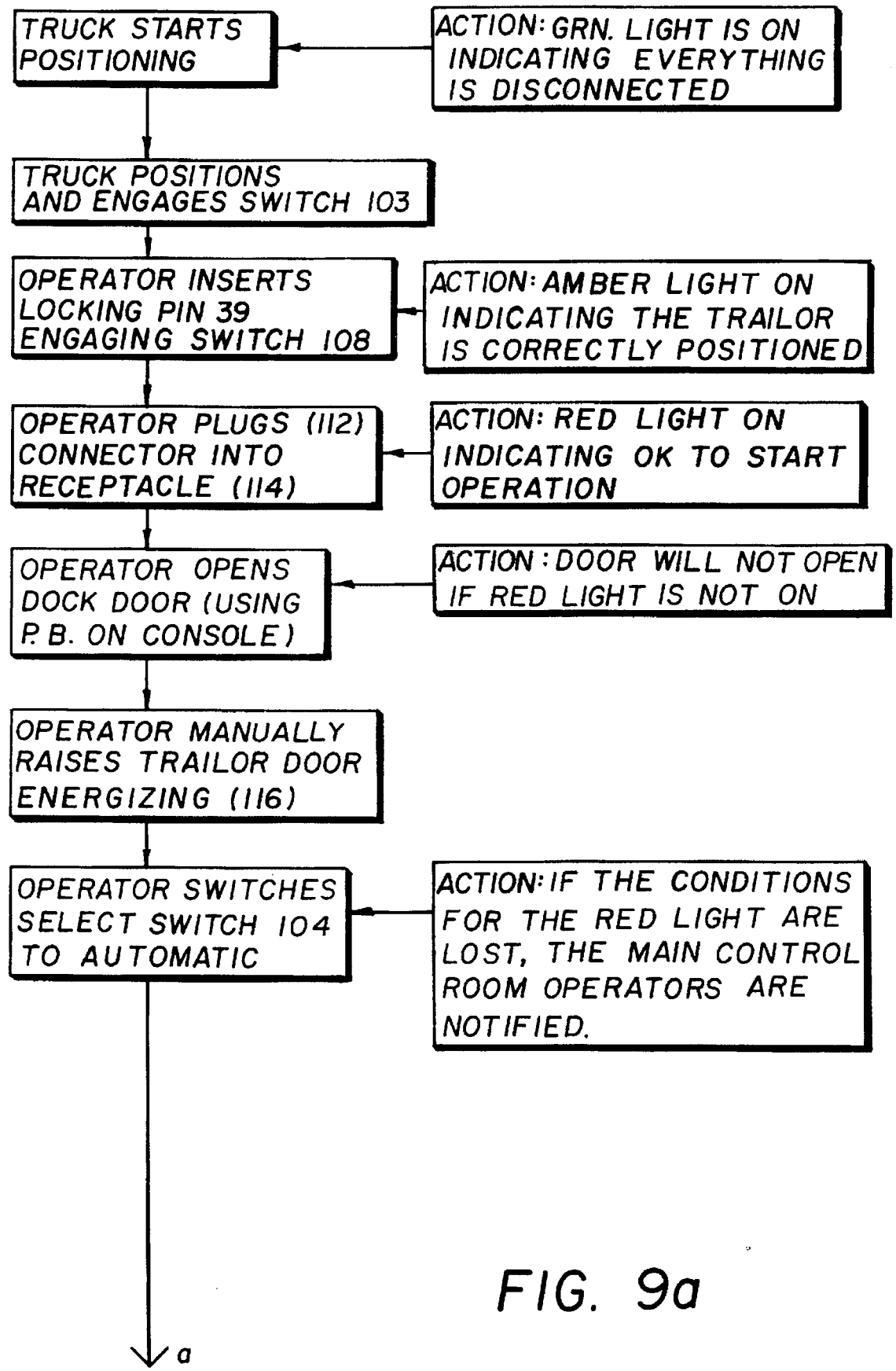
FIGS. 9a, b and c represent a single flow chart, when juxtaposed, of the trailer load/unload operational process; and, FIG. 10 is a diagram of the system control architecture governing the network of converging means.
Figure 9B:
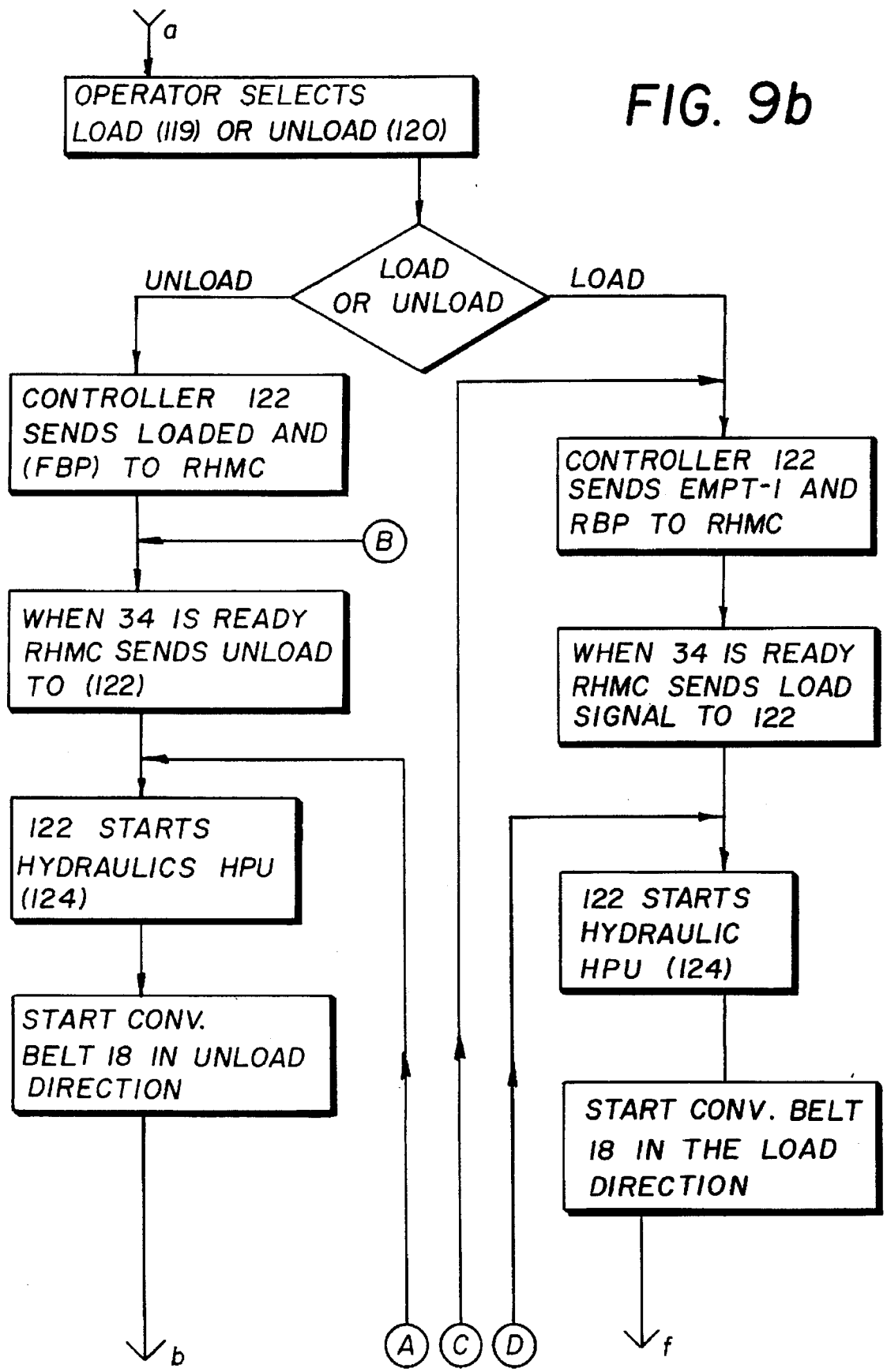
Figure 9C:
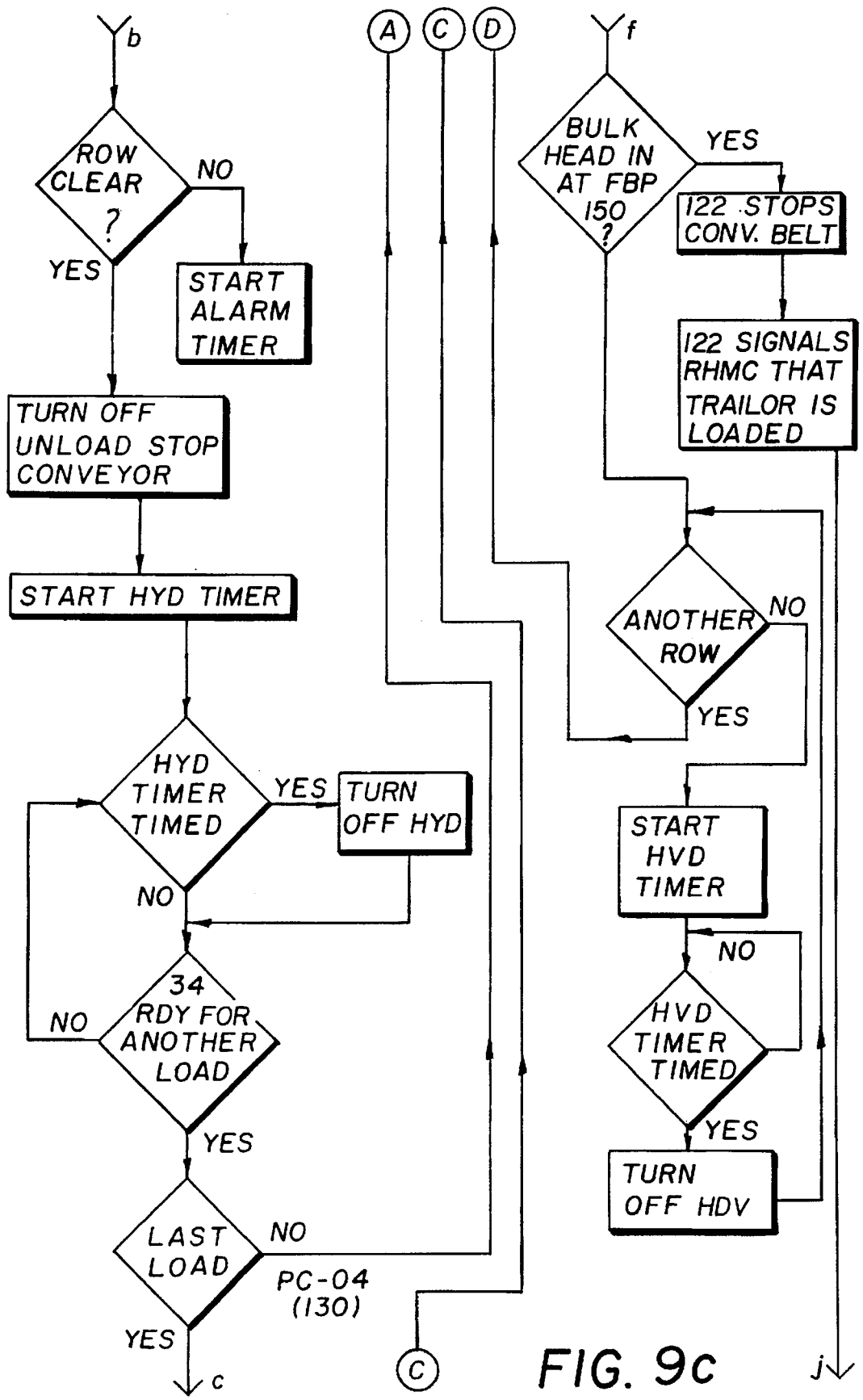
Figure 9D:
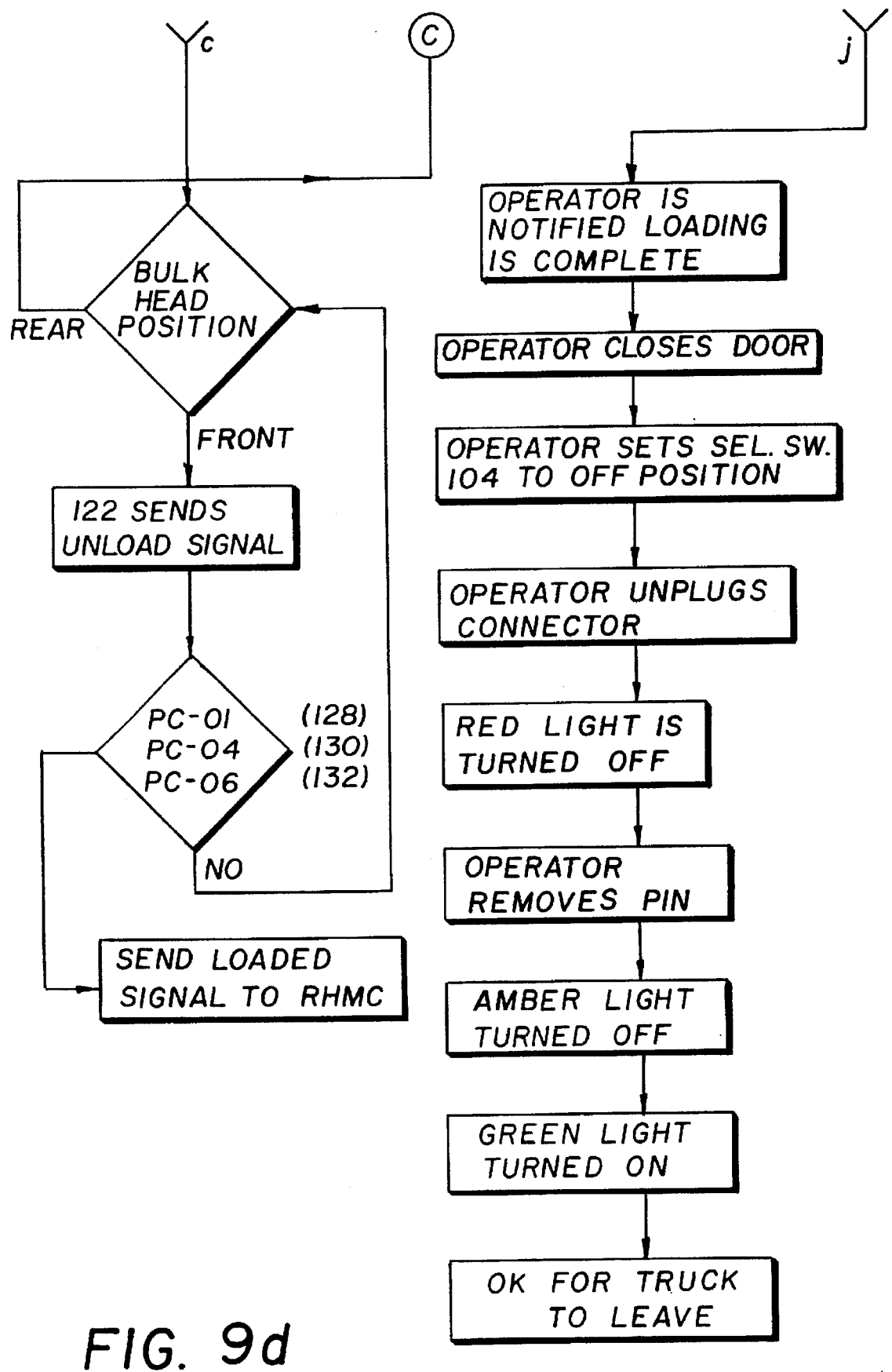

FIGS. 3-4, and 8 show means provided for positioning the rear exit portion 16 of the trailer 12 against the entrance portion 30 of the first environmentally enclosure 32. Preferably, an arrangement of guides 31 and ramps 33 are used, in conjunction with guide lines (not shown) positioned on the floor of first environmentally controlled enclosure 32, for the convenience of the trailer operator. The ramps 33 and guides 31 are rigidly attached to the outer wall of the first enclosure 32, by any suitable means, such as with screws or nails. This assures that the conveyor belt 18 of the trailer 12 will be fixed stable at the proper height to communicate with conveyor rollers 34 of the first environmentally controlled enclosure 32, while the trailer tires (T) maintain contact with the floor. Once in position, proper positioning during loading and unloading of cargo containers 15 is assured by locking the trailer 12 using, preferably, a docking pin 39 and controls (not shown). Seals (not shown) around the perimeter prevents airborne contaminants from entering the environment while the inner door 30 of the first environmentally controlled enclosure 32 is opened.

Figure 6:
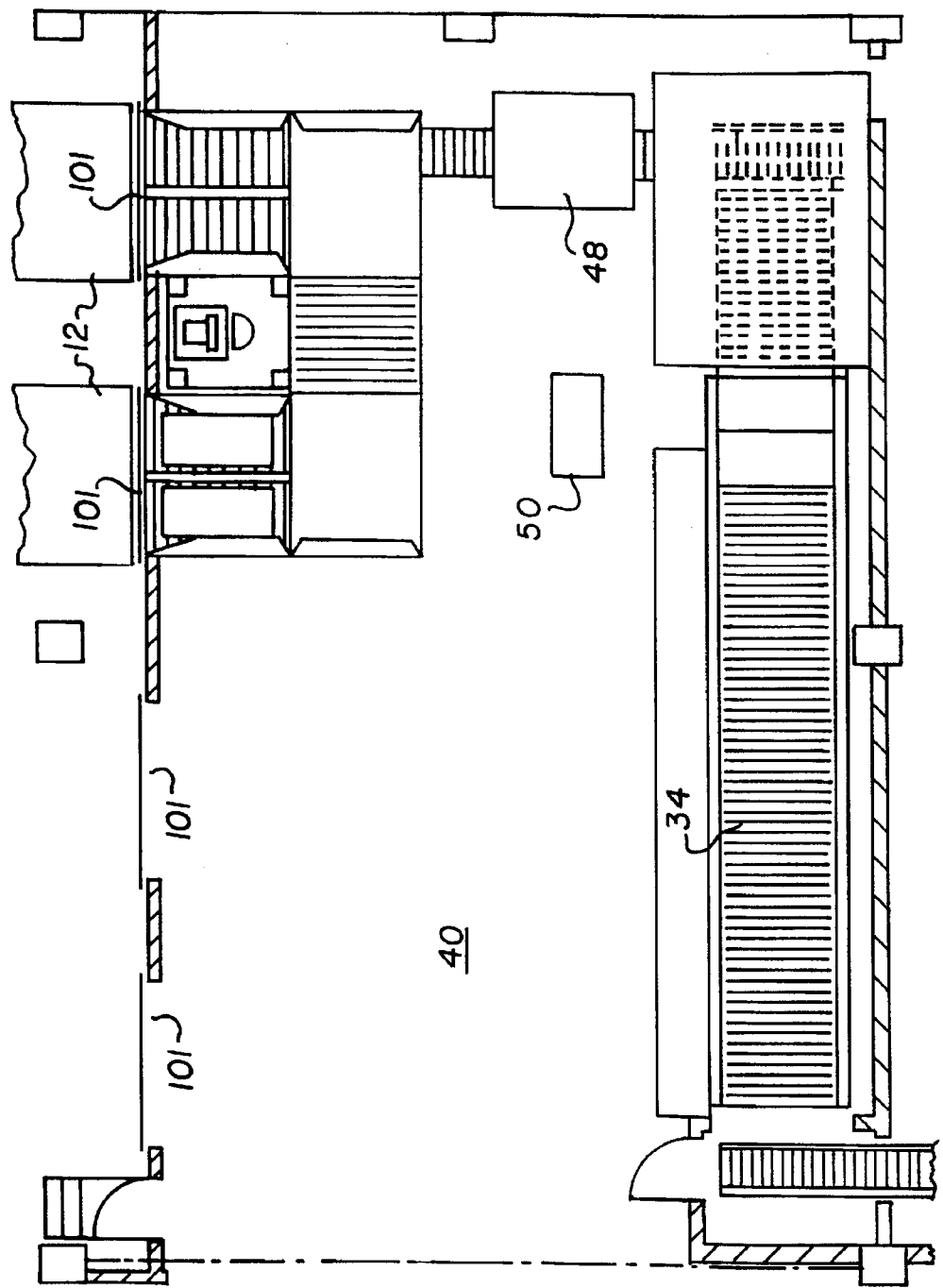
FIG. 6 is an enlarged view of the second environmentally controlled enclosure.

According to FIGS. 1 and 6, a cleaner station 48 for cleaning particulate contamination from the cargo containers 15 is also provided downstream of environmentally controlled enclosure 32. In this embodiment, cooperating brushes made of static conducting soft polyethylene bristles and an air stream synchronously activated are employed for engageably contacting and removing particulates from the cargo container 15.

Figure 5:
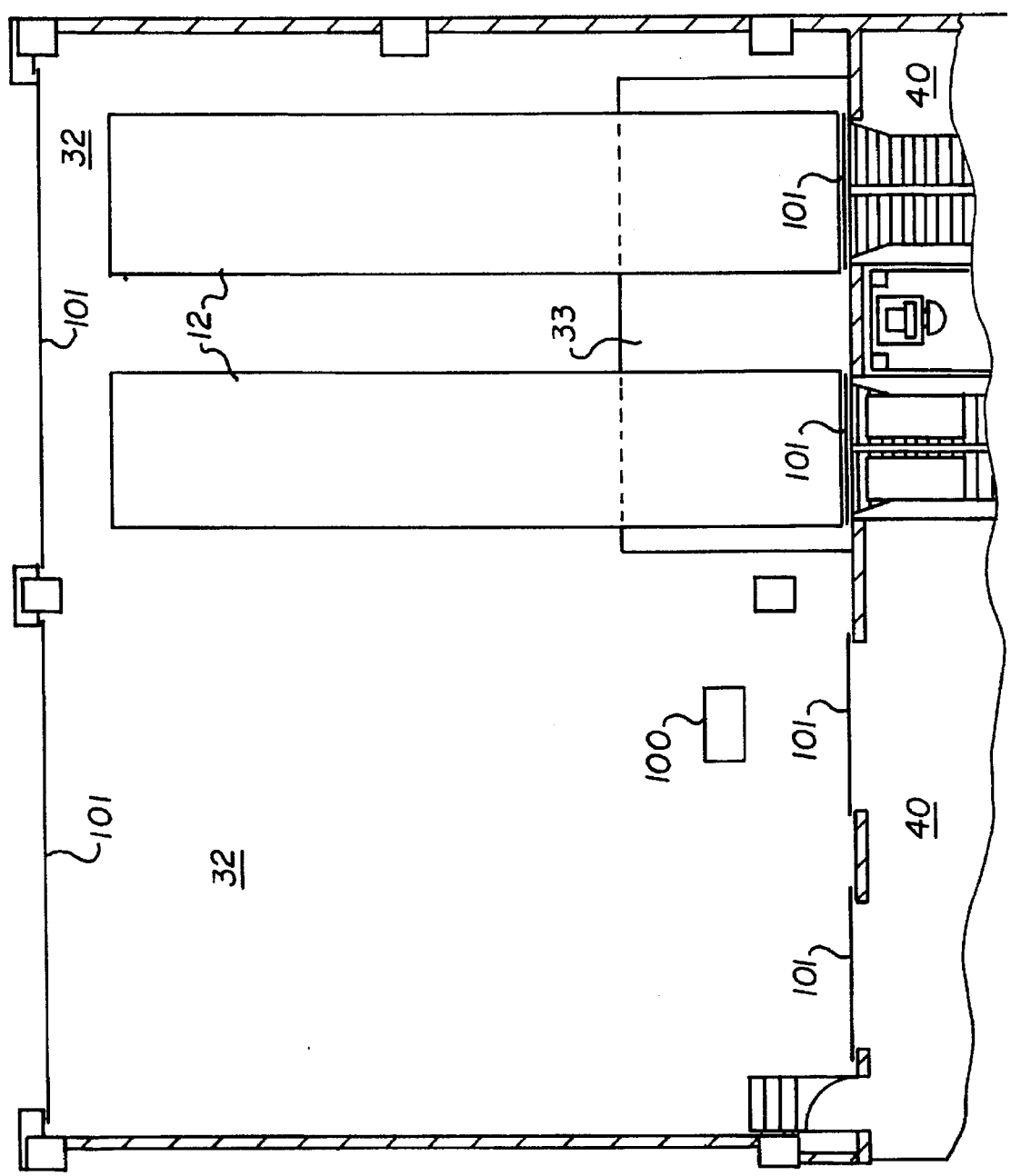
FIG. 5 is plan layout view of the first environmentally controlled enclosure.
Figure 7:
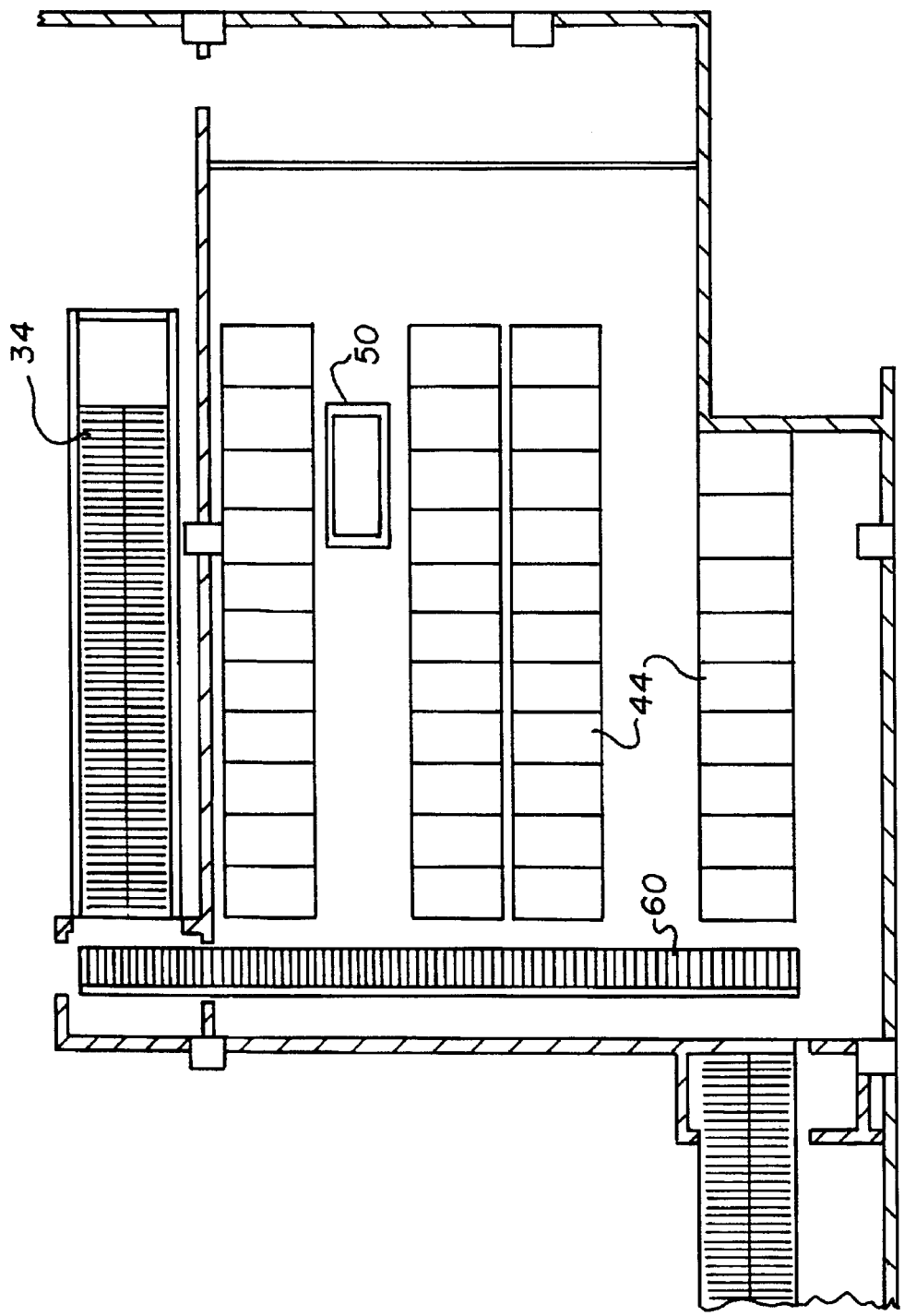
FIG. 7 is an enlarged view of the third environmentally controlled enclosure.

FIGS. 5-7 show a lay out of the first, second and third environmentally controlled enclosures 32,40,42. To ensure maximum protection from contamination, the cargo containers 15 of photosensitive material are processed in first, second and third environmentally controlled enclosures 32,40,42. Air quality in enclosures 32,40,42 is regulated by controlled air flow velocities, air flow pressure differential and by using an arrangement of laminar air flow filters, preferably HEPA (High Efficiency Particulate Air) filters manufactured by Cambridge Filter Corp., P.O. Box 4906, Syracuse, N.Y. 13221.

Referring again to FIG. 5-7, cargo containers 15 of photosensitive material conveyed first from trailer 12 and into the first environmentally controlled environment 32, are then conveyed to the second environmentally controlled enclosure 40 via conveying means 34. The preferred conveying means 34 in the second environmentally controlled enclosure 40 is manufactured by Hytrol Conveyors, 2020 Hytrol Drive, Jonesboro, Ariz. 72401. Cargo containers 15 are subsequently conveyed to the third enclosure 42, preferably a storage and retrieval area, or to a manufacturing facility (not shown). Reject cargo containers 15 entering the second environmentally controlled enclosure 40 are diverted to a reject station for evaluation and final disposition. Means are provided in the second environmentally controlled enclosure 40 for conveying cargo containers 15 from a first conveying position to a second conveying position substantially above the first conveying position wherein the cargo containers 15 are automatically delivered to a third environmentally controlled enclosure 42. This conveying transition comprising conveying means 34 enables the cargo containers 15 to travel from one level or floor in a building (not shown) containing the first, second and third enclosures 32,40,42 to a higher level or floor in the building.

Referring to FIGS. 1, 6, and 7, a lifting means, preferably a powered stacker crane mechanism 50 (FIG. 7) manufactured by Harnischfeger Engineers, Inc. of Milwaukee, Wis., is used for handling the cargo containers 15 once in enclosure 42. Lift mechanism 50 is adapted to traverse a fixed path in enclosure 42 while maintaining full access to a plurality of vertically positioned storage racks 44 therein. Lift mechanism 50 is further adapted to receive cargo containers 15 from second environmentally controlled enclosure conveyor 40 as cargo containers 15 enter enclosure 42. Lift mechanism 50 is also capable of locating a vacant storage position on storage rack 44 in third environmentally controlled enclosure 42 where cargo containers 15 are stored. More particularly, lift mechanism 50 is adapted for moving the cargo containers 15 to a predetermined rack 44 containing preselected cargo containers 15 in the third environmentally controlled enclosure 42. The cargo containers 15 are engaged by lift mechanism 50 and then moved to conveyor means 60 for transport to a manufacturing area (not shown) or, if desired, directed to the cargo carrying compartment 14 of trailer 12 for shipment. The latter conveyance of cargo containers 15 is via interconnected conveyor means 34 in first and third environmentally controlled enclosure 32,42. Skilled artisans will appreciate that any number of interconnected conveying means 34 may be networked through any number of enclosures within the scope of the present invention.

Figure 10:
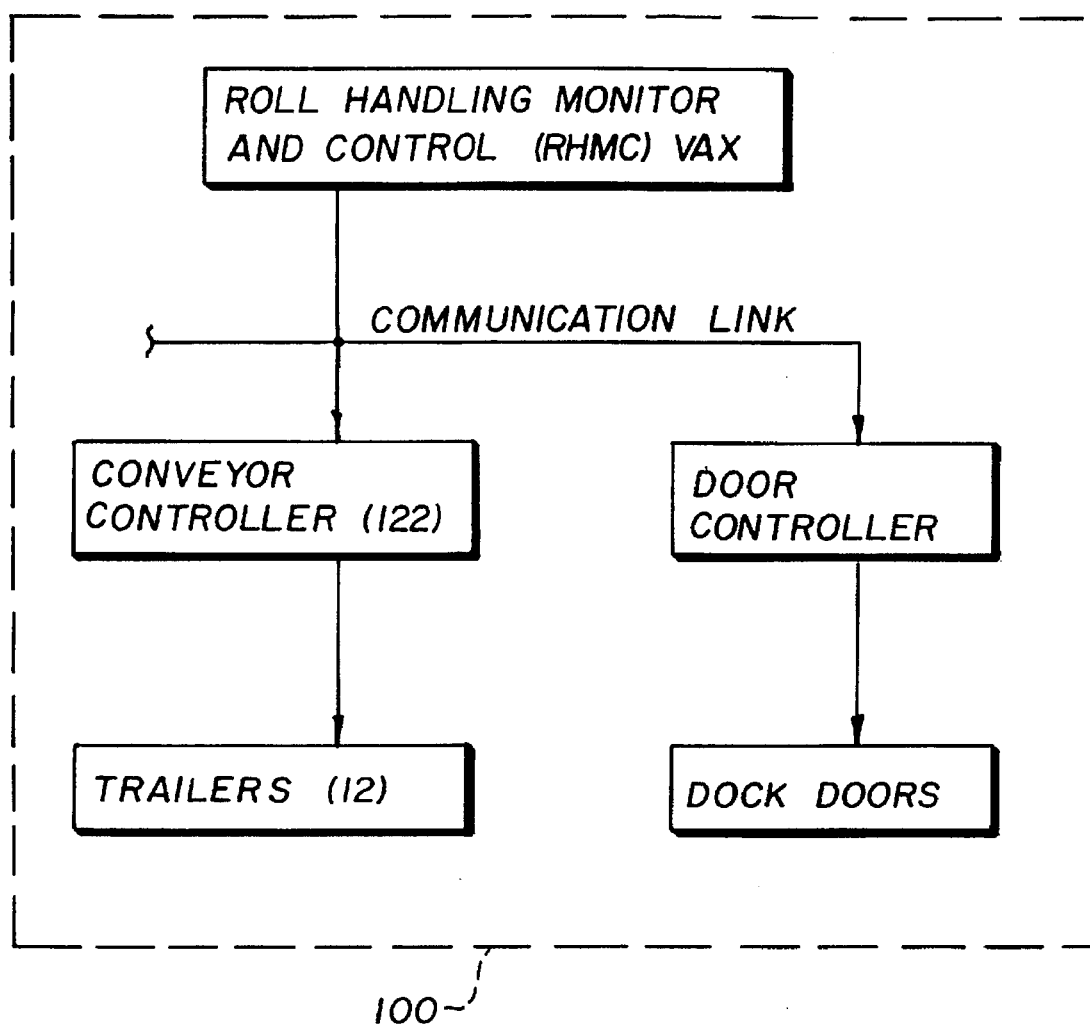

According to FIGS. 9 and 10, an automatic control system 100 (described below), governed by a general purpose computer, is used to actuate conveying means 18 on the trailer 12 and the cooperating system of interconnecting conveying means 34 serving the several enclosures 32,40, 42. As seen in FIG. 9, control system 100 is designed to function only after confirmation of the alignment and positioning of the trailer 12, as described above.

SYSTEM OPERATION

In FIG. 9, a flow chart of control system 100 for controlling and governing the flow and distribution of cargo containers 15 through trailer 12 and the environmentally controlled enclosures 32,40,42. In operation, system 100, controlled by a general purpose computer (not shown), is actuated by a door opening switch 101 positioned on an exterior portion 102 of first environmentally controlled enclosure 32. The trailer 12 (FIGS. 2, 3, and 5) is securely docked at environmentally controlled enclosure 32 and its wheels are checked (not shown) so as to prevent further movement. When the trailer 12 is properly positioned employing the interface guidance system described above, the trailer energizes switch 103 (FIG. 8) which confirms a successful docking. In FIG. 8, a locking pin 39 is inserted into guide 31 and shoe 106 to secure the trailer 12 to the enclosure 32, energizing limit switch 108, and illuminating a AMBER light on the dock enclosure. Further, the driver plugs a connector 112 into a receptacle 114 on the trailer 12, illuminating an "RED" light on the dock 32. Selector switch 104 is set to "AUTO" by the driver. The selector switch 104 enables the system 10 to be controlled entirely from the environmentally controlled enclosure 32 rather than from the trailer 12. Failure to either insert the locking pin 39 and/or plug the connector 112 into the trailer 12 will result in an alarm on the main system console. The driver opens the dock enclosure door and then opens the trailer door, energizing limit switch 116 (FIG. 3). The driver presses the "LOAD" 118 or "UNLOAD" 120 button. If the trailer 12 is loaded, the trailer 12 will send the "LOADED" signal and the "FRONT BULKHEAD POSITION" ("FBP") signal. When the conveyor system 18 in the first environmentally controlled enclosure is ready to accept the first row of cargo containers (A), controller 122 will send an "UNLOAD" signal starting hydraulic power unit (HPU) 124 and initiating conveyor belt 18 in the unload direction. When the first row of cargo containers (A) has exited the trailer 12, controller 122 will discontinue the "UNLOAD" signal. When the conveyor belt 18 is clear to accept another row of cargo containers (A), controller 122 will again send an "UNLOAD" signal until that row of cargo containers (A) has exited the trailer 12. If the trailer 12 does not receive the "UNLOAD" signal within five minutes after a row of cargo containers (A) has exited the trailer 12, the hydraulic power unit 124 will shut down and wait for the "UNLOAD" signal to restart. When the last row of cargo containers (A) has been unloaded, the trailer 12 will send the controller 122 the "REAR BULKHEAD POSITION" (REP) signal. If the trailer 12 is empty, the trailer 12 will send either the front bulkhead position (FBP) signal or rear bulkhead position (RBP) signal. If the bulkhead 17 (FIG. 3) is in the front position, the controller 122 will send the trailer 12 the "UNLOAD" signal until the bulkhead 17 reaches the rear position and the trailer 12 sends the RBP signal. If at any time PC-01, PC-04, or PC-06 sees a load, the conveyor belt 18 will stop and the trailer 12 will send the "LOADED" signal and wait for the "UNLOAD" signal from the controller 122. When the bulkhead 17 is at the rear position, the trailer 12 is ready to be loaded and will wait for the "LOAD" signal from the controller 122. If the trailer 12 does not receive the "LOAD" signal from the controller 122 within five minutes, the hydraulic power unit 124 on the trailer 12 will shut down and wait for the "LOAD" signal to restart. When the first row of cargo containers (A) on the conveyor belt 18 is ready to be loaded, the controller 122 will send the "LOAD" signal to the trailer 12. This will start the hydraulic power unit 124 on the trailer 12 and the conveyor belt 18 will travel forward, loading the cargo boxes onto the trailer 12. When the next row of cargo containers (A) on the conveyor belt 18 is ready to be loaded, the controller 122 sends the "LOAD" signal to the trailer 12 and the conveyor belt 18 loads them into the trailer 12. The conveyor belt 18 will continue to move the load, to a maximum of six rows of cargo containers (A), forward until the front bulkhead position sensor 150 sees the bulkhead 17 and sends the "FBP" signal to the controller 122 which stops the conveyor belt 18. When the trailer 12 has been loaded, the driver will close the trailer door and the dock door. The driver sets selector switch 104, SW-06, to the "OFF" position, turning the power to the trailer 12 OFF and de-energizing a RED light, PL-03, on the dock enclosure. The driver unplugs the connector 112 from the trailer 12, de-energizing an RED light, PL-04, on the dock. The driver then removes the pin from the ramp and ramp show de-energizing limit switch, LS-09, and de-energizing the red light, PL-05, on the dock. The trailer 12 can now be moved.

While the invention has been described with a certain degree of particularity it is manifest that many changes may be made in the details of construction and the arrangement of components without departing from the spirit and scope of this disclosure. It is understood the that the invention is not limited to the embodiments set forth herein for purposes of exemplification, but is to be limited only by the scope of

| Parts List | |
|---|---|
| Cargo Containers | A |
| System | 10 |
| Trailer | 12 |
| Cargo Carrying Compartment | 14 |
| Storing/Conveying Cargo Containers | 15 |
| Rear Exit End | 16 |
| Bulkhead | 17 |
| Conveying Means | 18 |
| Entrance Portion | 30 |
| Guides | 31 |
| Controlled Enclosure | 32, 40, 42 |
| Ramps | 33 |
| Automatic Conveyor Means | 34 |
| Guidelines | 35 |
| Docking Pin | 39 |
| Storage Rack | 44 |
| Cleaner | 48 |
| Lift Mechanism | 50 |
| Conveyor Means | 60 |
| System Control Means | 100 |
| Door Opening | 101 |
| Exterior Portion | 102 |
| Switch | 103 |
| Selector Switch | 104 |
| Shoe | 106 |
| Limit Switch | 108 |
| Connector | 112 |
| Receptacle | 114 |
| Limit Switch | 116 |
| "Load" | 118 |
| "Unload" | 120 |
| Controller | 122 |
| Hydraulic | 124 |
| Position Sensor | 150 |

We claim:

1. A system for conveying cargo containers in the absence of contamination through a vehicle having a storage compartment defined by a first floor portion, a first ceiling portion and first sidewalls surrounding said first floor and first ceiling portions and then through at least two environmentally controlled enclosures: each said environmentally controlled enclosures having a second floor portion, a second ceiling portion and adjoining second sidewalls surrounding said second floor and second ceiling portions, said system comprising:

an entrance abutting said vehicle for positioning at least one of said at least two enclosures proximate to said storage compartment of said vehicle, said entrance port comprising means for sealing an exit end of said vehicle and said at least one of said at least two enclosures against the ingress of particulate contamination;

a first means for precisely aligning and snugly positioning said exit end of said vehicle with said entrance port;

a second means operatively associated with said vehicle for conveying said cargo containers from said storage compartment of said vehicle, through said entrance port and into said proximate enclosure;

a third means in the proximal enclosure for conveying the cargo container in a predetermined direction so as to selectively load or unload the cargo containers in said proximal enclosure or into said storage compartment of said vehicle; and, a system control means cooperatively associated with said vehicle and said environmentally controlled enclosures for automatically actuating said second and third means once said aligning and positioning means has been confirmed.

2. The system recited in claim 1 wherein each of said environmentally controlled enclosures comprises a conveying means for transporting said cargo container therein, each of said conveying means and said second conveying means associated with said vehicle being provided with means for communicating with said system control means.

3. The system recited in claim 2 further comprising a fourth means positioned in at least one of said environmentally controlled enclosures and cooperating with the conveying means therein for cleaning said cargo container therein.

4. The system recited in claim 1 wherein said first means comprise a predetermined arrangement of guides and ramps cooperating with said vehicle, said ramps and guides being positioned so as to enable said vehicle to form an intimate seal between said exit end of said vehicle and the entrance port of at least one of said environmentally controlled enclosures.

5. The system recited in claim 1 further provided with a cargo container control means for detecting and reading bar coded indicia from the cargo container and signalling the system control means.

6. The system recited in claim 1 wherein said controller means comprises a selector switch for determining whether to load or unload cargo the containers from said vehicle.

7. The system recited in claim 6 wherein said controller means further comprises a timer means for selectively conveying said cargo containers at predetermined intervals to any one of said enclosures.

* * * * *